United States Patent

Liao

Patent Number: 5,372,698
Date of Patent: Dec. 13, 1994

[54] HIGH MAGNETIC MOMENT THIN FILM HEAD CORE

[75] Inventor: Simon H. Liao, Santa Barbara, Calif.

[73] Assignee: Seagate Technology, Inc., Scoots Valley, Calif.

[21] Appl. No.: 944,393

[22] Filed: Sep. 14, 1992

Related U.S. Application Data

[60] Division of Ser. No. 744,827, Aug. 12, 1991, Pat. No. 5,168,410, which is a continuation of Ser. No. 425,735, Oct. 20, 1989.

[51] Int. Cl.$^5$ .............................................. C25D 5/00
[52] U.S. Cl. .................................... 205/90; 205/119; 205/122; 205/176; 205/184; 205/255
[58] Field of Search .................. 360/125, 126; 205/89, 205/90, 119, 122, 176, 184, 255

[56] References Cited

U.S. PATENT DOCUMENTS

| | | | |
|---|---|---|---|
| 3,737,583 | 6/1973 | Tsuchiya et al. | 179/100.2 C |
| 4,079,430 | 3/1978 | Fujishima et al. | 360/126 |
| 4,165,525 | 8/1979 | Koel et al. | 360/125 |
| 4,201,837 | 5/1980 | Lupinski | 428/457 |
| 4,242,710 | 12/1980 | Hempstead et al. | 360/113 |
| 4,411,716 | 10/1983 | Shiiki et al. | 148/403 |
| 4,440,609 | 4/1984 | Blakeslee et al. | 204/43 T |
| 4,488,195 | 12/1984 | Yanaginchi et al. | 360/125 |
| 4,650,712 | 3/1987 | Hirose | 428/323 |
| 4,661,216 | 4/1987 | Anderson et al. | 204/44.5 |
| 4,685,012 | 8/1987 | De Wit et al. | 360/125 |
| 4,716,484 | 12/1987 | Kaminaka et al. | 360/125 |
| 4,780,781 | 10/1988 | Sano et al. | 360/126 |
| 4,858,049 | 8/1989 | Kabayashi et al. | 360/126 |
| 5,011,581 | 4/1991 | Dimata | 205/90 |

FOREIGN PATENT DOCUMENTS 0303324 4/1988 European Pat. Off.
57-155707 3/1981 Japan .

OTHER PUBLICATIONS

Robert C. Faber, Landis on Mechanics of Patent Claim Drafting, Mar. 1990, p. 136.
Kouichi Nishioka et al., Magnetic Properties of Sputtered Co-Ni-Fe-Pd Films for Thin-Film Heads, May 1989, IEEE Transactions on Magnetics, vol. 25, No. 3, pp. 2602-2606.

Primary Examiner—John Niebling
Assistant Examiner—Brendan Mee
Attorney, Agent, or Firm—Kinney & Lange

[57] ABSTRACT

A thin film magnetic read/write head has a copper iron boron core. Cobalt, iron and boron are included in the electroplating bath used to form the pole pieces of the thin film magnetic head. Following exposure to a rotating magnetic field, the pole pieces have high saturation magnetization, low coercivity, low anisotropy and large permeability.

21 Claims, 12 Drawing Sheets

HIGH MAGNETIC MOMENT THIN FILM HEAD CORE

This is a divisional of application of Ser. No. 07/744,827, filed Aug. 12, 1991, which in turn is a File Wrapper Continuation of original parent application Ser. No. 07/425,735, filed on Oct. 20, 1989, now U.S. Pat. No. 5,168,410.

BACKGROUND OF THE INVENTION

1. Field of the Invention

The present invention relates to a thin film magnetic head having a cobalt-iron-boron core.

2. Description of the Prior Art

Thin film magnetic read/write heads are used for magnetically reading and writing information on a magnetic storage medium such as a magnetic disk or magnetic tape. As data storage requirements have risen, it has become increasingly desirable to provide high levels of information storage densities on the magnetic storage medium. Increased storage densities require magnetic read/write heads which provide a strong writing field in relation to the applied writing current and high permeability for large signal output. This may be achieved by making the anisotropy field ($H_k$) as small as possible thereby increasing the permeability ($\mu$). Increased $\mu$ also results in increased sensitivity when information is read from the magnetic storage medium. Smaller coercivity ($H_c$) in a read/write magnetic head is also desirable.

U.S. Pat. No. 4,661,216 relates to a cobalt-nickel-iron electroplating composition bath used to produce a thin film head having a saturation magnetization ($4\pi M_s$) of about 14K gauss, a coercivity ($H_c$) of about 2 Oersteds, an anisotropy field ($H_k$) of about 13 Oersteds and a permeability ($\mu$) of about 1000.

It would be desireable to produce a thin film magnetic head having a yet smaller anisotropic field ($H_k$) coercivity ($H_c$), while maintaining a large saturated magnetization ($M_s$ or $4\pi M_s$), and increasing the permeability ($\mu$).

SUMMARY OF THE INVENTION

The present invention provides a thin film magnetic head having a reduced coercivity $H_c$ and anisotropy field $H_k$ while maintaining a large saturation magnetization ($M_s$ or $4\pi M_s$). An increased permeability ($\mu$) is also provided.

The improved thin film head core of the present invention uses a core comprising cobalt-iron with the addition of boron in the alloy. This improved core may be deposited through electrodeposition techniques. The anisotropy field, $H_k$, may be reduced if an alternating magnetic field is applied to the core during the electroplating process. Alternatively, the core may be subjected to rotating field annealing to lower the anisotropy field, $H_k$. The resulting cobalt iron boron core has a saturation magnetization ($4\pi M_s$) of about 19K gauss, $H_c$ of about 1.0 Oersteds, $H_k$ of about 7 Oersteds and a permeability ($\mu$) of about 2500.

DETAILED DESCRIPTION OF THE PREFERRED EMBODIMENT

The present invention provides a thin film magnetic head having magnetic characteristics offering improved performance. The magnetic head of the present invention is formed with a metal alloy comprising cobalt, iron and boron to improve head performance. A cursory review of magnetics is given to explain the performance characteristics of thin film magnetics. FIGS. 1–5 and the following discussion describe the meaning and significance of the easy and hard axis, anisotropy field ($H_k$), permeability ($\mu$), coercivity ($H_c$) and saturation magnetization ($4\pi M_s$).

Figure 1:
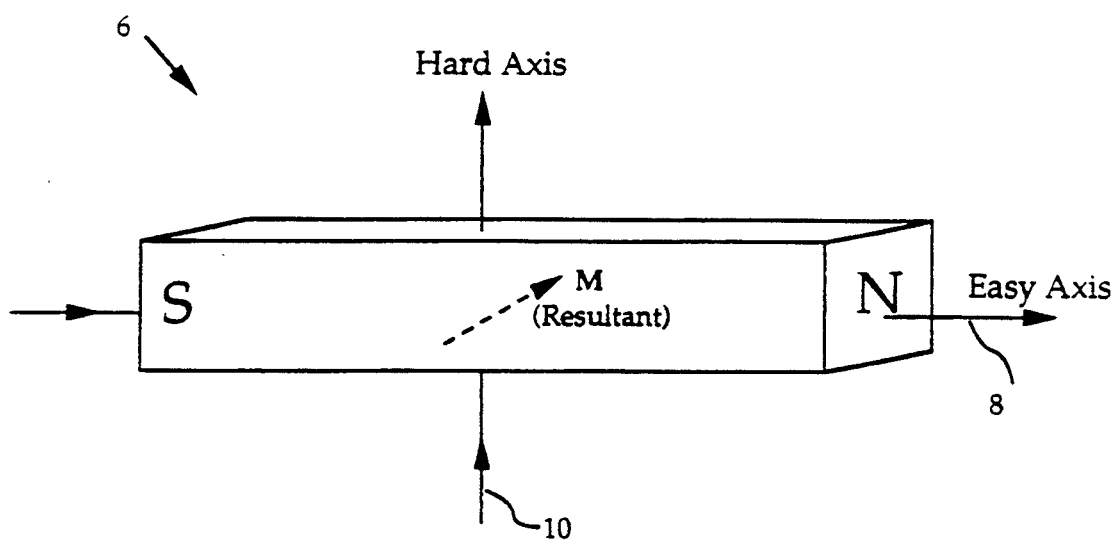
FIG. 1 is a plan view of a bar magnet.

Bar magnet 6 is shown in FIG. 1 along with arrows 8 and 10 indicating the easy axis and the hard axis respectively of bar magnet 6. The easy axis refers to the preferred direction of the magnetization vector (M) within a magnetic material in a relaxed state. In a magnet, the easy axis is parallel with the axis of the poles. The hard axis, on the other hand, refers to a direction perpendicular to the easy axis, as shown in FIG. 1 by arrow 10. When a magnetizing field H is applied to a magnetic material, the magnetization vector M of the material tends to deflect in the direction of the applied field H. By applying a sufficiently large magnetization field H in a direction other than the direction of the magnetic material's easy axis, the material's magnetization vector M is deflected away from its preferred direction in the relaxed state, parallel to the easy axis. The deflected magnetization vector M is shown as M (Resultant) in FIG. 1.

Figure 2:
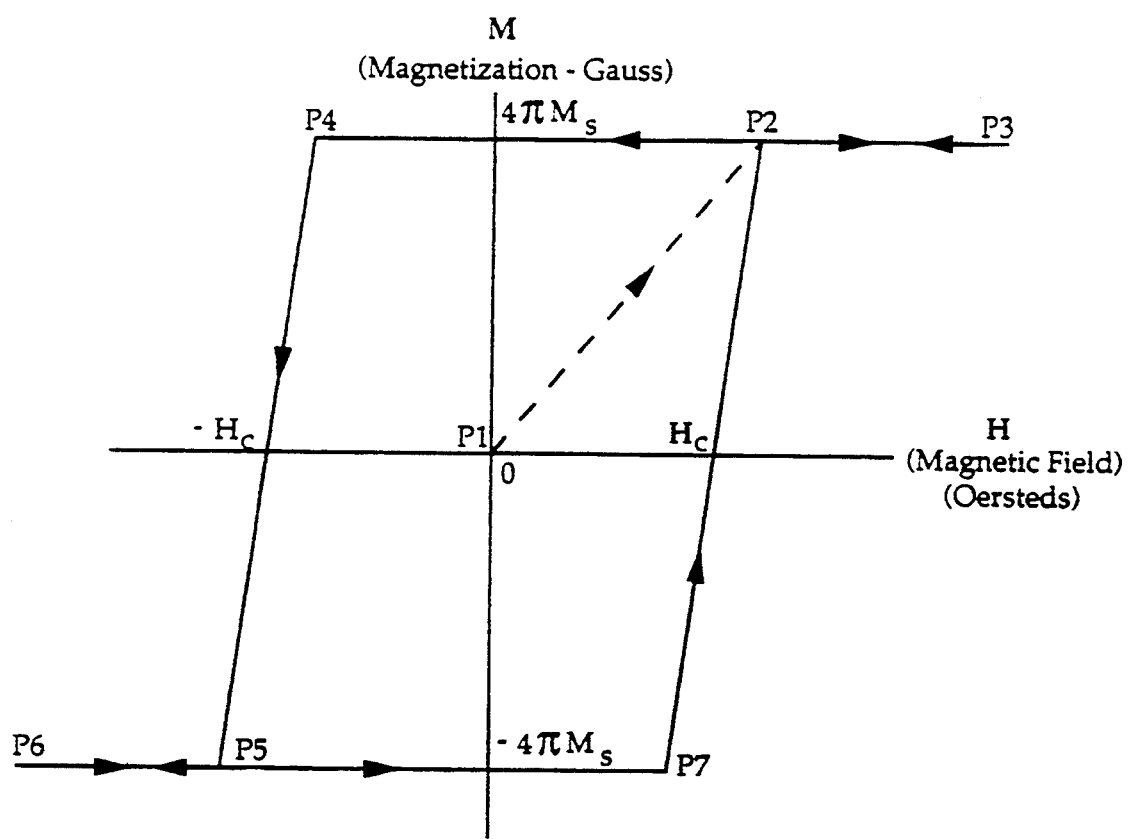
FIG. 2 is graph of magnetization versus applied magnetic field in the easy axis of a magnetic material.

When an alternating magnetic field M is applied to a magnetic material along that material's easy axis, a graph of magnetization M versus applied magnetic field H forms a hysteresis loop as shown in FIG. 2. The magnetization M is shown as $4\pi M$ in units of Gauss. M, the applied magnetic field, is shown in units of Oersteds.

Starting from the point labelled P1 in FIG. 2, as a magnetic field H (in the easy axis direction) is applied to the magnetic material, the magnetization M follows the dashed line to the point labelled P2 in FIG. 2. Once the material reaches the point P2 in FIG. 2, the material is saturated and any additional magnetic field H applied to the material results in no further increase in the material's magnetization. Further increase of applied M moves the plot to P3 in FIG. 2. This saturation magnetization value is $4\pi M$, in FIG. 2.

As the level of the applied magnetic field H is decreased and the direction of its vector is reversed, the hysteresis graph for the material follows the path from point P3 through P2 and to the point labelled P4 in FIG. 2. The material's magnetization does not change from its saturated value of $4\pi M_s$. A further increase of the applied magnetic field H in the reverse direction causes the magnetization M within the magnetic material to begin to decrease following the path from point P4 to the point labelled P5 passing through the point labelled $-H_c$ on the hysteresis loop shown in FIG. 2. Once point P5 in FIG. 2 is reached, further increase of the magnetic field H (in the reverse direction) results in no further increase in the magnetization of the material and the material is once again saturated at the value shown as $-4\pi M_s$ in FIG. 2. Further increase in the strength of the applied magnetic field M moves the plot from point P5 to the point labelled P6 in FIG. 2.

As the applied magnetic field H is increased from its value at point P6 through point P5 and zero and to the point labelled P7 in FIG. 2, the magnetization of the material does not change from its saturated value of $-4\pi M_s$. Additional increase of the magnetic field H causes the material's magnetization to follow the path from point P7 to point P2 through $H_c$ on the hysteresis loop. By continuing to vary the applied magnetic field H, the material may be made to repeatedly follow the hysteresis path of FIG. 2.

Figure 3:
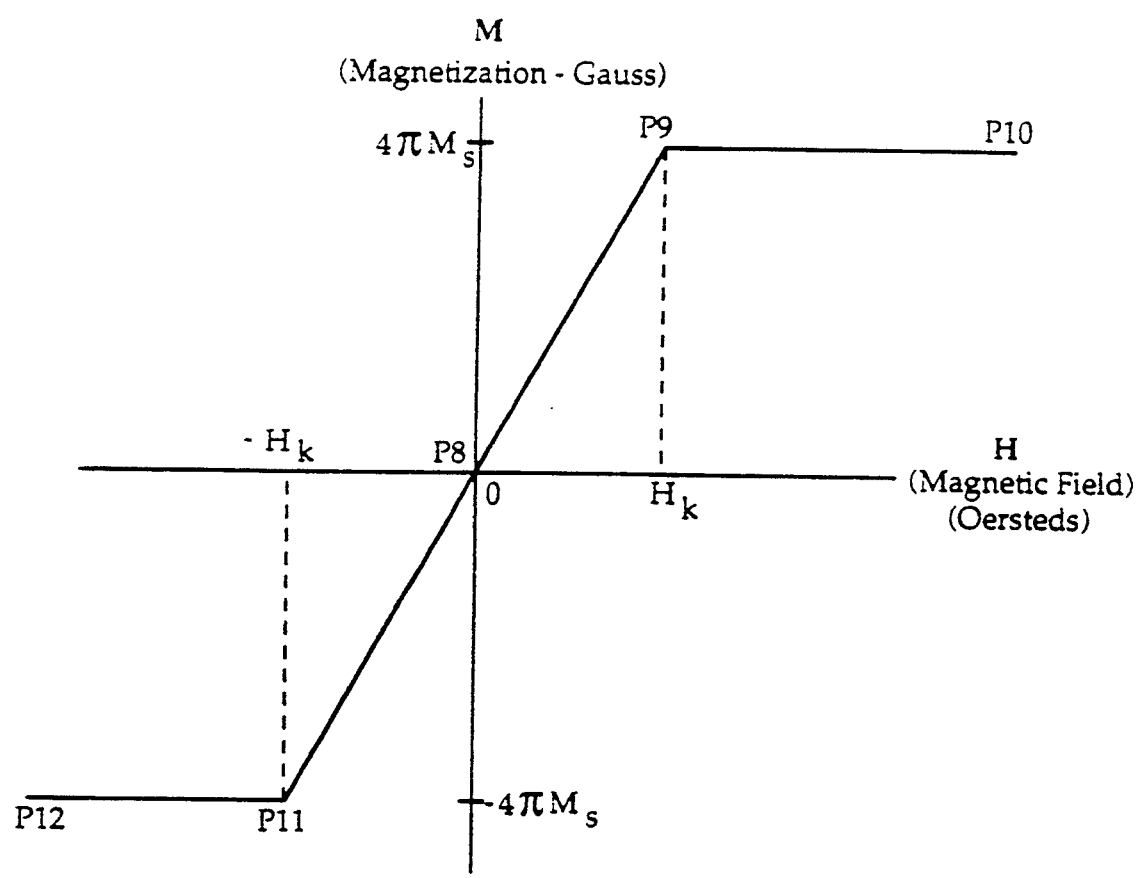
FIG. 3 is a graph of magnetization versus applied magnetic field in the hard axis of a magnetic material.

The points labelled $H_c$ and $-H_c$ represent the coercive force, or coercivity of the magnetic material. The area of the hysteresis loop corresponds to the energy loss during one hysteresis cycle. Hysteresis loss is the energy lost in the form of heat in overcoming the friction encountered during domain wall motion and domain rotation. In magnetic read/write heads, it is desirable to have a large saturation magnetization and a small $H_c$ such that the shape of the hysteresis loop is generally tall and thin. FIG. 3 shows a graph of magnetization M of a material in $4\pi M$ measured in gauss versus applied magnetic field H. In FIG. 3, the vector H has been applied in a direction parallel to the hard axis and perpendicular to the easy axis of a magnetic material. Unlike the graph of FIG. 2, there is no hysteresis loop in the graph of magnetization M verses applied magnetic field M along the hard axis. Similar to the graph of FIG. 2, in FIG. 3 H is the applied magnetic field and $4\pi M$ is the resultant magnetization vector within the magnetic material. With no applied magnetic field M, the magnetization along the hard axis direction is zero. As the value of H is increased in the direction parallel with the hard axis, the plot of magnetization follows the line from the point labelled P8 on the graph of FIG. 3 to the point labelled P9 in FIG. 3. At point P9, a maximum magnetization value $4\pi M$ has been reached for the material and the material is saturated having a magnetization equal to $4\pi M_s$. Further increase in the applied magnetic field M results in no further increase in the magnetization of the material beyond the $4\pi M_s$ value, and the plot continues to the point labelled P10.

As applied M is reduced through zero and made increasingly negative, the magnetization M of the material decreases from its value at points P9 and P10 of $4\pi M_s$ through zero at point P8 and ultimately reaches saturation again with a value of $-4\pi M$, shown at the point labelled P11 in FIG. 3. Further increase in the applied magnetic field (in the reverse direction) beyond the level necessary to reach the point P11 results in no corresponding increase in the material's magnetization M and the plot moves to the point labelled P12 in FIG. 3. The value of the applied magnetic field H in the hard axis necessary to place the magnetic material in saturation is known as the anisotropic field and is labelled $H_k$. The permeability of the material, $\mu$ may be expressed as:

$$\mu = \frac{B}{H} = \frac{4\pi M + H}{H} = \frac{4\pi M}{H} + 1 \approx \frac{4\pi M_s}{H_k} \quad \text{Equation 1}$$

where $M_s$ is the saturated magnetization value for the material and $H_k$ is the anisotropy of the material. The final approximation in Equation 1 may be made because the factor $4\pi M/H$ is much greater than one. Thus the slope of the graph of FIG. 3 is approximately equal to the permeability $\mu$ of the magnetic material. The larger that $\mu$ is for the material, the smaller the applied magnetic field H must be to achieve the same magnetization $4\pi M$. FIG. 3 graphically shows that as $H_k$ is decreased the permeability $\mu$ for the material will increase as the slope of the curve in FIG. 3 increases.

Figure 4:
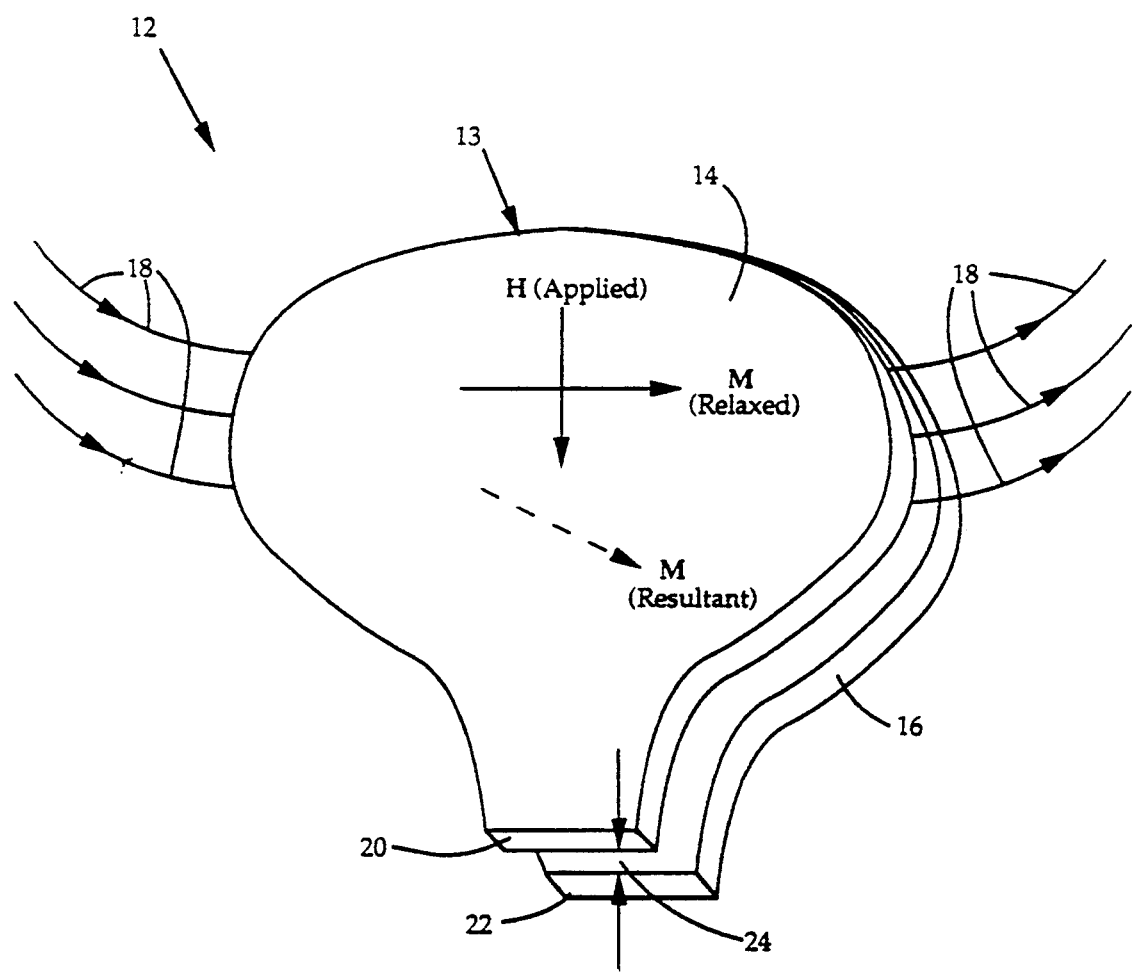
FIG. 4 is a plan view of a thin film magnetic read/write head.

FIG. 4 shows thin film head 12 comprising core 13 including upper pole piece 14 and lower pole piece 16. Conductors 18 extend through thin film head 12 and are sandwiched between upper pole piece 14 and lower pole piece 16. Upper pole piece 14 includes upper pole tip 20 while lower pole piece 16 includes lower pole tip 22. A gap 24 is shown as formed between upper pole tip 20 and lower pole tip 22. Typically, alumina fills the gap. A magnetic storage medium (not shown) may be placed near gap 24 such that information may be written on or read from the medium.

Also shown in FIG. 4 is an arrow labelled M (Applied) indicating the direction of the applied magnetic field H and an arrow labelled M (Relaxed) indicating the magnetization M of the thin film head 12 in its relaxed state. In operation, a magnetic storage medium such as a magnetic disk or a magnetic tape moves in the region near gap 24 formed between upper pole 20 and lower pole tip 22. As electrical current is caused to flow in conductors 18 in the direction indicated, a magnetic field H will be applied to thin film head 12 in the direction shown by the arrow labelled H (Applied) in FIG. 4. This applied magnetic field causes the magnetization M of the material to change direction from the direction indicated by the arrow labelled M (Relaxed) to the direction indicated by the arrow formed by the dashed lined labelled M (Resultant). As the dashed line labelled M (Resultant) is deflected away from the easy axis in a direction toward gap 24 formed between upper pole tip 20 and lower pole tip 22 due to the applied magnetic field M from electrical current passing through conductors 18, upper pole tip 20 will become an increasingly strong north pole while lower pole tip 22 becomes a south pole. This causes a fringe field to form around gap 24 with a magnetic field vector having direction from upper pole tip 20 to lower pole tip 22.

In a similar manner, if the current through conductors 18 were reversed from the direction indicated in FIG. 4, upper pole tip 20 would become a south pole while lower pole tip 22 would become a north pole. This would cause a fringe field around gap 24 with a magnetic field in a direction from lower pole tip 22 to upper pole tip 20. Thus it is possible by modulating the flow of the electrical current through conductors 18 to modulate the magnetization of upper pole tip 20 and lower pole tip 22. Gap 24 between upper pole tip 20 and lower pole tip 22 causes a fringe field to extend beyond the region of gap 24. When a magnetic storage medium such as a magnetic disk or a magnetic tape is placed in this fringe field, information may be recorded by impressing a magnetic field upon the medium through the fringe field associated with thin film head 12. Similarly, magnetization patterns impressed upon a storage medium passing through the fringe field region of thin film head 12 cause an electrical current to flow through conductors 18 such that the stored information may be recovered.

Figure 5:
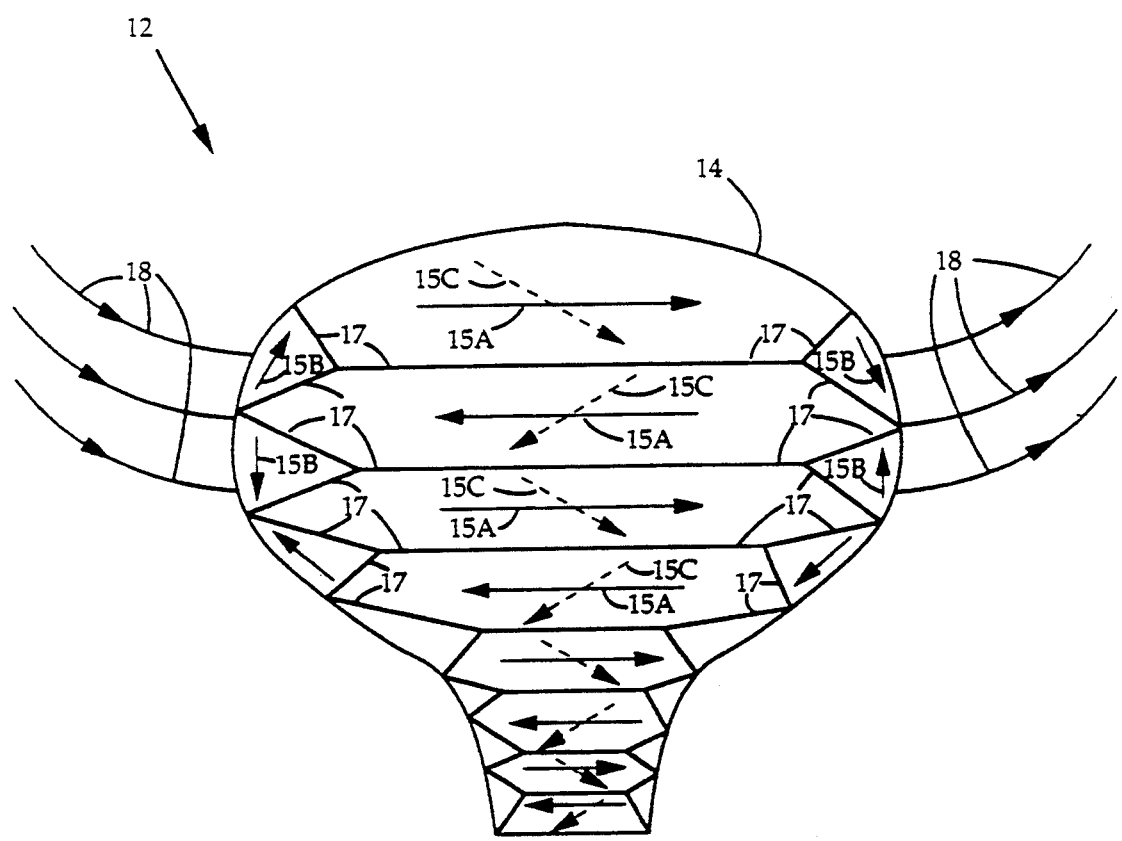
FIG. 5 is a plan view of a thin film magnetic read/write head showing a magnetic domain pattern.

FIG. 5 shows thin film head 12 of FIG. 4 including arrows 15A, 15B and 15C indicating the direction of the magnetization vectors M in the magnetic domains across upper pole piece 14. Solid arrows 15A in FIG. 5 indicate the direction of a magnetic domain's easy axis. Lines 17 in FIG. 5 separating two adjacent magnetic domains indicate the domain walls. Solid arrows 15A indicate the direction of the magnetization vector M in the relaxed state of thin film head 12 along its easy axis. Small vertical arrows 15B along the edge of upper pole piece 14 shown in FIG. 5 indicate the magnetization vector in the closure domains. Closure domains complete the magnetic circuit between adjacent opposing domains. As electrical current is caused to flow through conductors 18 in the direction indicated, the direction of the magnetization vector M of the domains in upper pole piece 14 are deflected away from the easy axis as indicated by arrows 15C formed by the dashed lines. It is this deflection that causes north and south poles to form at upper pole tip 20 and lower pole tip 22, respectively. If $H_k$ is made small, thereby increasing the permeability $\mu$ for thin film head 12, the required strength of the applied magnetic field H will be lower to achieve the same amount of deflection of the material's magnetization M and a smaller electrical current applied through conductors 18 is required With small $H_c$ values, there is little hysteresis that can effect the magnetization rest state. This promotes the lowest energy condition after removal of any applied magnetic fields.

It is also desireable to have a magnetic head with a large saturation magnetization value $M_s$ such that it is possible to apply more powerful magnetic fields to the magnetic storage medium through the fringe field region. A thin film head having a large permeability $\mu$ (which is directly proportional to $M_s$, see Equation 1 above) will also have increased sensitivity when information is read back from the magnetic storage medium. Increased sensitivity causes even weak changes in the magnetization of the magnetic storage medium passing through the fringe field region of thin film head 12 to produce relatively large changes in the electrical current flowing through conductors 18.

With the present invention, thin film read/write heads are produced having large saturation magnetization in $M_s$, low coercivity $H_c$, low anisotropy $H_k$ and large permeability $\mu$.

Figure 6:
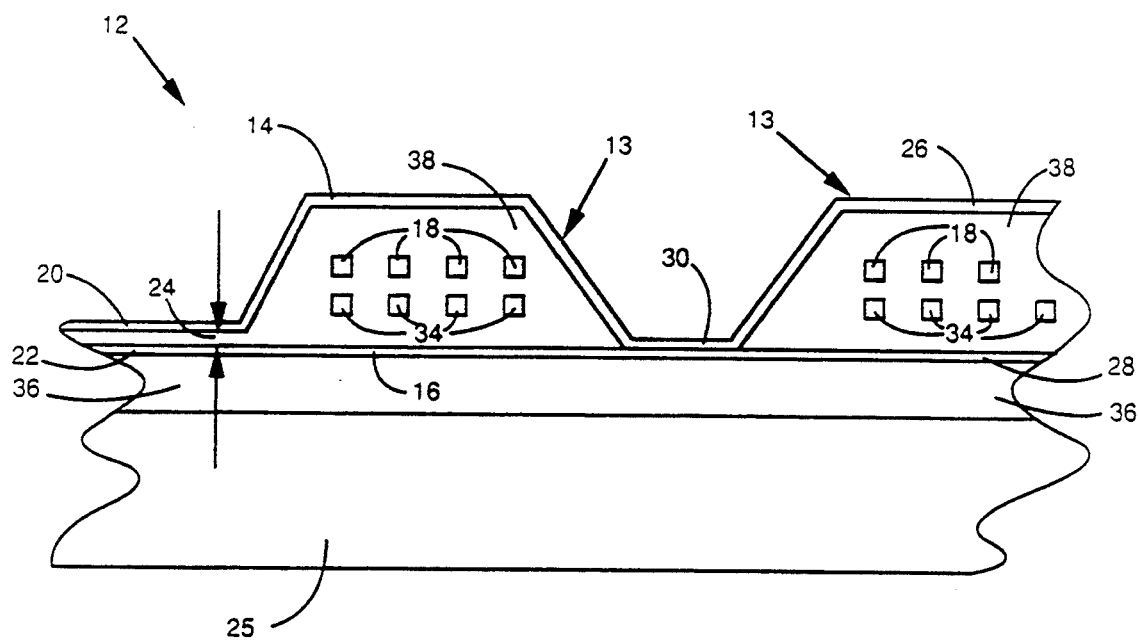
FIG. 6 is a cross sectional view of a thin film magnetic read/write head.
Figure 7:
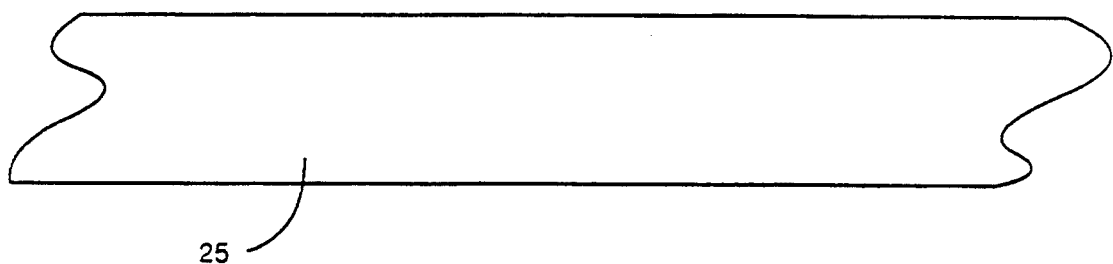
FIG. 7 is a cross sectional view of the substrate shown in FIG. 6.

FIG. 6 shows a cross sectional view of a thin film magnetic head 12 of FIGS. 4 and 5. Thin film head 12 includes base or "flyer" substrate 25 and pole pieces or core 13. Flyer substrate 25 may comprise, for example, ALSIMAG material. Core 13 comprises pole piece 14 and front lower pole piece 16. Upper pole piece and lower pole piece portions 14 and 16 form upper pole tip 20 and lower pole tip 22 between which gap 24 is formed. Core 13 also includes rear upper portion 26 and rear lower portion 28. Upper pole piece and lower pole piece 14 and 16 and rear upper and lower portions 26 and 28 of core 13 meet at center area or "via" 30 (not shown in FIGS. 4 and 5).

Thin film head 12 of FIG. 6 uses two core windings formed by conductors 18 and 34. Although only conductors 18 are shown in FIGS. 4 and 5, conductors 18 and 34 are formed in a coil around via 30 of core 13 with a portion of the wrapping being sandwiched between upper pole piece and lower pole piece 14 and 16 of core 13 and a portion of the wrapping sandwiched between rear upper and lower portions 26 and 28 of core 13. Core 13 is separated from substrate 25 by base coat 36. Typically, base coat 36 is an insulator such as alumina, $Al_2O_3$. The area between upper pole piece and lower pole piece 14 and 16 is filled with an insulating material 38. Typically, insulating material 38 is photoresist. Gap 24 between upper pole tip 20 and lower pole tip 22 is filled with alumina, $Al_2O_3$. Insulating material 38 is also sandwiched between rear upper and lower portions 26 and 28 of core 13.

During fabrication, multiple heads similar to thin film head 12 may be deposited across the entire surface of base substrate 25. After the layers of thin film head 12 are deposited as shown in FIG. 6, base substrate 25 (upon which head 12 is formed) is "diced" or sliced into many individual thin film heads, each carried by a portion of base substrate 25, such that upper and lower pole tips 20 and 22 and gap 24 are exposed. Gap 24 and pole tips 20 and 22 may then be lapped in a direction generally inward, toward the center of thin film head 12, to the desired throat dimensions. The lapping process is a grinding process in which the exposed portion of gap 24 is applied to a diamond slurry. Electrical contacts (not shown) are applied to conductors 18 and 34 of thin film head 12. The completed head may then be attached to some type of carrying fixture (not shown) for use in reading and writing data on a magnetic storage medium such as a computer disk.

In operation, the magnetic storage medium is placed near upper and lower pole tips 20 and 22 which form gap 24. During the read operation, the changing magnetic field due to the moving storage medium impresses a magnetic field upon upper and lower pole tips 20 and 22 formed by upper pole pieces and lower pole pieces 14 and 16 of core 13. This impressed field is carried around conductors 18 and 34 through upper pole piece 14, via 30 and lower pole piece 16 of core 13. This causes an electrical current to be induced in conductors 18 and 34. This electric current is representative of the magnetic field produced by the moving magnetic storage medium. During the write operation, an electric current is caused to flow in conductor 18 or conductor 34. This results in a magnetic field in core 13 which is applied to the storage medium (not shown) due to the fringing effect at gap 24 formed between upper and lower pole tips 20 and 22 of core 13.

The steps used in fabricating thin film magnetic head 12 of FIGS. 4, 5 and 6 are shown individually in FIGS. 7-12. In the cross sectional view of FIG. 7, base substrate 25 is shown. Base substrate 25 is typically large relative to the dimensions of the thin film magnetic heads and is referred to as a "wafer." During the manufacturing process, many thin film heads such as thin film head 12 typically are fabricated upon base substrate 25. For this example, however, only the fabrication of single thin film magnetic head 12 is shown. Typically, base substrate 25 is made of an electrically conductive material, such as ALSIMAG.

Figure 8:
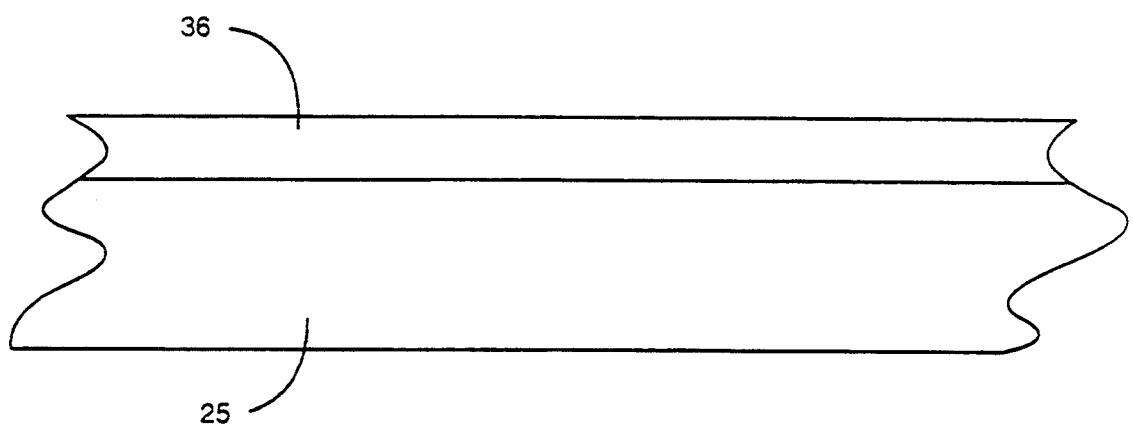
FIG. 8 is a cross sectional view of the substrate of FIG. 7 including a base coat layer.

A base coat layer 36 is deposited across the entire base substrate 25 as shown in FIG. 8. Base coat 36 is a nonconductive material, typically comprising alumina, $Al_2O_3$. Base coat 36 may be applied using sputtering techniques.

Figure 9:
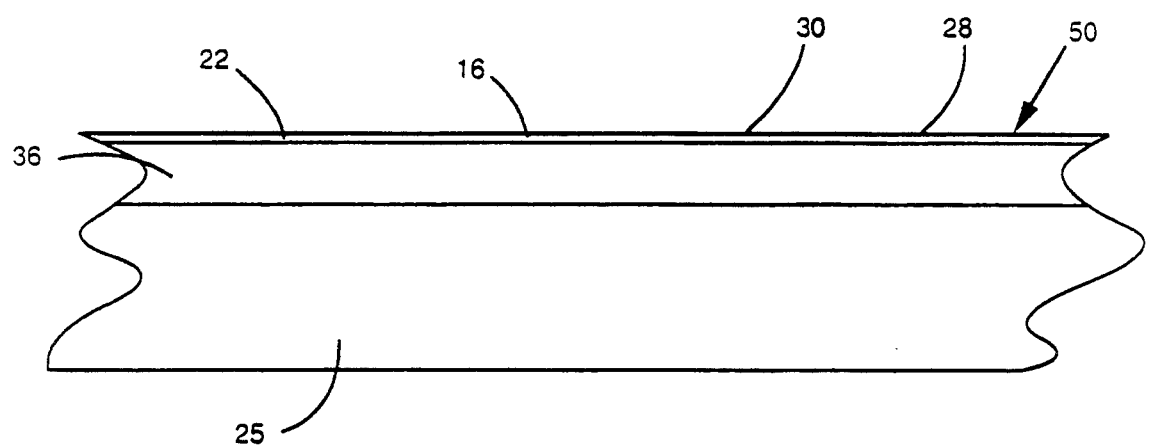
FIG. 9 is a cross sectional view of the structure of FIG. 8 following deposition of a portion of the magnetic core material.

As shown in FIG. 9, thin film layer 50 of magnetic material is applied across the surface using electrodeposition techniques. This process is described below in more detail. Layer 50 forms lower pole piece 16 and lower rear portion 28 of core 13, as well as lower pole tip 22 and part of via 30. Layer 50 comprises a portion of the CoFeB core of the present invention.

Figure 10:
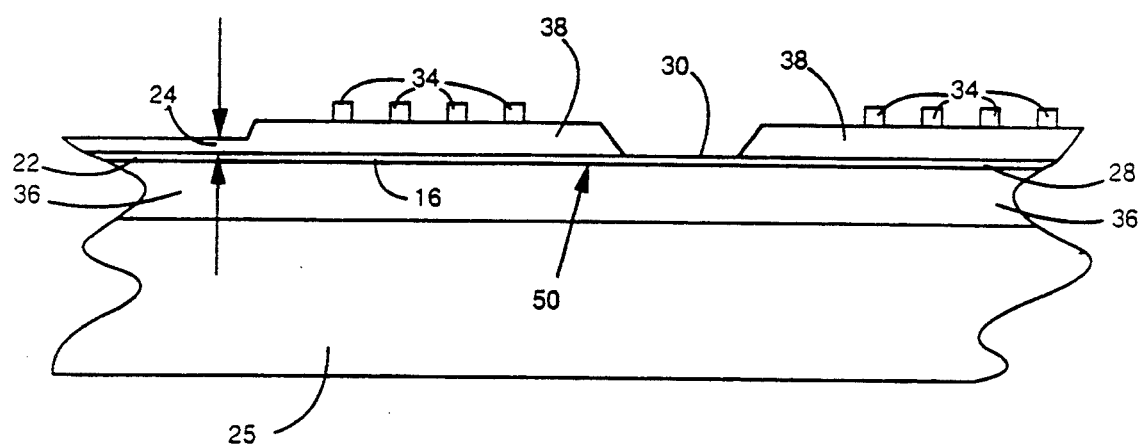
FIGS. 10 and 11 are cross sectional views of the structure of FIG. 9 following deposition of electrical conductors.

Using photolithographic techniques, insulating layer 38 is deposited upon layer 50 of core 13 in the shape shown in FIG. 10. Alumina, $Al_2O_3$ is deposited in gap 24. Conductors 34 are deposited upon insulating layer 38 and formed in a coiled shape.

Figure 11:
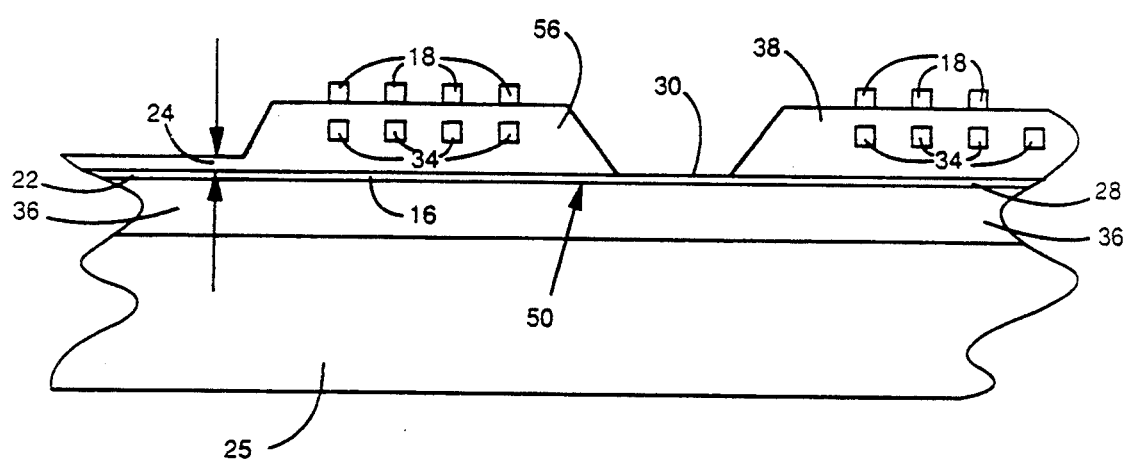

In FIG. 11, insulating layer 38 has been built up slightly using photolithographic masking and etching techniques. Conductors 18 are deposited similar to conductors 34, and formed in a coiled shape.

Figure 12:
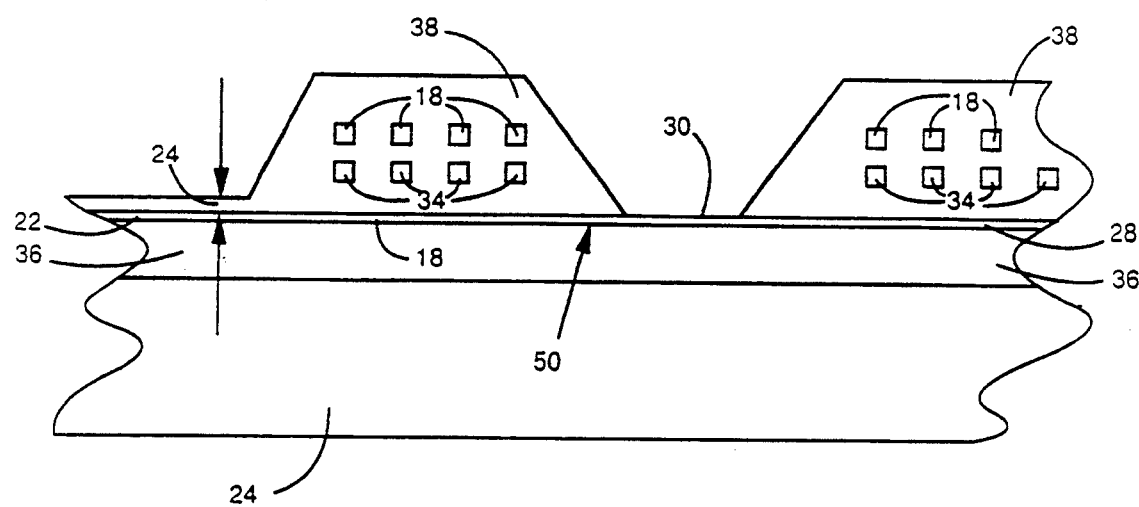
FIG. 12 is a cross sectional view of the structure of FIG. 11 following deposition of insulation layers.

In FIG. 12, insulating layer 38 has been built up and covers conductors 18 and 34. Next, another layer of magnetic material is deposited over the structure shown in FIG. 12 to form upper pole piece 14, rear upper portion 26, and a portion of via 30 as shown in FIG. 6. This layer is deposited using electrodeposition techniques and comprises CoFeB.

Upper pole piece 14 and lower pole piece 16 are deposited upon substrate 25 through electroplating. By applying an alternating magnetic field during this electrodeposition step, the anisotropic field $H_k$ may be reduced. Alternatively, the core may be annealed in a rotating field to lower the anisotropic field, $H_k$. The electroplating bath used in the present invention to deposit pole piece 14 and 16 comprises a solution of cobalt, iron and boron. The addition of boron reduces the coercivity $H_c$ of the pole pieces. For thicker films forming upper pole piece 14 and lower pole piece 16, this reduction of coercivity $H_c$ is even greater. The addition of boron has little effect on magnetization saturation flux density, which remains about 19K gauss. The addition of boron along with a rotating magnetic field applied during the electrodeposition step or the use of rotating magnetic field annealing reduces the coercivity $H_c$ and $H_k$ of the pole pieces of thin film head 12. In a preferred embodiment, the concentration of boron in the electroplating bath varies from about 0.1% to 2.0% by weight. Iron concentration may vary from about 7.0% to 12.0% by weight with the balance of the electroplating bath being cobalt. One suitable electroplating bath for forming the thin film magnetic read/write head of the present invention is:

TABLE 1

| Composition | Amount |
| --- | --- |
| $CoSo_4 7H_2O$ | 50–300 grams/liter |
| $FeSo_4 H_2O$ | 3–15 grams/liter |
| $H_3BO_3$ | 5–50 grams/liter |
| Sodium Saccharin Dihydrate | 0.5–4 grams/liter |
| Dodecyl Sodium Sulfate | 0.1–3 grams/liter |
| DMAB | 1–10 drops/liter of 2 grams/50 m liter dissolved DMAB |
| Sodium Citrate | 0.5–10 grams/liter |

DMAB (Dimethyl Amine Borane) acts as a reducing agent and provides the disassociated boron used for deposition of the CoFeB thin film core. The disassociated cobalt ion may range from 5–100 grams/liter in the electroplating bath. The iron ion may range from 0.2–5.0 grams/liter in the electroplating bath. Suitable temperature during electroplating is about 30° C. A suitable pH for the electroplating bath is about 3.5. The ratio between cobalt, iron and boron in the electroplating bath will remain approximately the same in the electroplated film.

Pulse electroplating maybe used during the deposition of the cobalt iron boron core using 6 ampere pulses with a 10 mS on time and a 90 mS off time. Pulse electroplating helps maintain the magnetic characteristics of the cobalt iron boron core as the cores thickness grows beyond about 0.5 microns, preventing the core from becoming isotropic and losing its hysteresis loop. The thin film exhibits useful magnetic characteristics for thickness between about 500 Angstroms and about 10 microns, preferably ranging between about 2000 Angstroms and about 3 microns.

It has been discovered that the anisotropy field $H_k$ of the core may be lowered by two alternative methods. During the electrodeposition of upper and lower pole pieces 14 and 16, a rotating magnetic field may be applied. This field should alternate between the normal axis of the core and 90° off the normal axis. Applying the normal field for 40 seconds of a one minute cycle and the 90° field for remaining 20 seconds of the one minute cycle provides a suitable ratio between the two field positions. Alternatively, this rotating field may be applied during an annealing step in which the core material is subjected to heat.

Table 2 shows a comparison between a nickel iron core (using 82 present nickel in the alloy), a cobalt iron core (using 90 percent cobalt in the alloy), and the cobalt iron boron core of the present invention (also using 90 percent cobalt in the alloy).

TABLE 2

| Core | Saturation Material Magnetization $4\pi M_s$ | Hc | Hk | μ |
| --- | --- | --- | --- | --- |
| 82NiFe | 10 KGauss | ~0.2 Oe | ~2.5 Oe | ~4000 |
| 90CoFe | 19 KGauss | ~3.0 Oe | ~13 Oe | ~1500 |
| 90CoFeB | 19 KGauss | ~1.0 Oe | ~7 Oe | ~2500 |

This table shows that $H_c$ and $H_k$ are reduced for the CoFeB core of the present invention while the value of μ is greatly increased over the cobalt iron core.

Using the cobalt iron boron core of the present invention, the thin film magnetic head coercivity $H_c$ is reduced over that of a cobalt iron thin film head as the thickness of the film is increased. Using the cobalt iron boron thin film magnetic head of the present invention, the head will have a high saturation magnetization $4\pi M_s$, low coercivity $H_c$, low anisotropy $H_k$ and an increased permeability μ. The thin film magnetic read/write head of the present invention offers improved reading and writing characteristics whereby magnetic storage density may be increased.

Although the present invention has been described with reference to preferred embodiments, workers skilled in the art will recognize that changes may be made in form and detail without departing from the spirit and scope of the invention. For example, different ratios of cobalt, iron and boron may be used in the core and the electroplating bath.

What is claimed is:

1. In a method of forming a thin film magnetic read/write head having a thin film magnetic core and a substrate, an improvement comprising:
   electrodepositing layers of a magnetic metal alloy having a crystalline structure which consists of cobalt, iron, and boron to form the thin film magnetic core on the substrate.

2. The method of claim 1 wherein each layer has a thickness in a range of about 500 Angstroms to about 10 microns.

3. The method of claim 1 wherein depositing layers comprises:
   depositing a non-conductive layer on a substrate;
   depositing a first magnetic layer of the magnetic metal alloy having a thickness in a range of about 500 Angstroms to about 10 microns upon the non-conductive layer;
   depositing gap material upon a portion of the first magnetic layer;
   depositing an insulating layer upon a portion of the first magnetic layer; and
   depositing a second magnetic layer of the magnetic alloy having a thickness in a range of about 500 Angstroms to about 10 microns upon the insulating layer whereby a portion of the first and second magnetic layers are in electrical contact forming a via and a portion of the first and second magnetic layers are separated by the gap material forming a magnetic read/write gap.

4. The method of claim 3 and further comprising:
   depositing electrical conductors formed in the shape of a coil in the insulating layer in the conductor carrying region during the depositing of the insulating layer.

5. The method of claim 1 and further comprising:
   applying a rotating magnetic field to the layer during electrodeposition.

6. The method of claim 5 wherein the rotating magnetic field alternates between a normal angle and a perpendicular angle about ninety degrees from the normal angle.

7. The method of claim 1 and further comprising:
   applying a rotating magnetic field to the core while annealing the core.

8. The method of claim 7 wherein the rotating magnetic field alternates between a normal angle and a perpendicular angle about ninety degrees from the normal angle.

9. The method of claim 1 wherein electrodeposition is from an electroplating bath containing cobalt, iron and boron, wherein the boron comprises, by weight, about 0.1% to about 2.0% of the total amount of cobalt, iron, and boron.

10. The method of claim 9 wherein the iron comprises, by weight, about 7.0% to about 12.0% of the total amount of cobalt, iron, and boron 11. The method of claim 1 wherein the magnetic metal alloy is deposited from an electroplating bath comprising:

| | |
|---|---|
| a. $CoSO_4 7H_2O$ | 50 to 300 grams/liter; |
| b. $FeSO_4 6H_2O$ | 3 to 15 grams/liter; |
| c. $H_3BO_3$ | 5 to 50 grams/liter; |
| d. Sodium Saccharin Dihydrate | 0.5 to 4 grams/liter; |
| e. Sodium Citrate | 0.5 to 10 grams/liter; |
| f. dimethyl amine borane (DMAB) | 1 to 10 drops/liter of 2 grams per 50 m liter dimethyl amine borane (DMAB); and |
| g. Dodecyl Sodium Sulfate | 0.1 to 3 grams/liter. |

12. The method of claim 11 wherein the bath has a pH of about 3.5.

13. The method of claim 1 wherein the magnetic metal alloy is deposited from an electroplating bath comprising:
   a. $Co^{+2}$ ions in a concentration of 5 to 100 grams/liter;
   b. $Fe^{+2}$ ions in a concentration of 0.2 to 5 grams/liter;
   c. dimethyl amine borane (DMAB) in a concentration of 1 to 10 drops/liter of 2 grams/50 m liter dissolved dimethyl amine borane (DMAB);
   d. $H_3BO_3$ in a concentration of 5 to 50 grams/liter;
   e. Saccharin in a concentration of 0.5 to 4 grams/liter;
   f. Sodium Citrate in a concentration of 0.5 to 10 grams/liter; and
   g. Dodecyl Sodium Sulfate in a concentration of 0.1 to 3 grams/liter.

14. The method of claim 13 wherein the bath has a pH of about 3.5.

15. A method of forming a thin film magnetic read/write head upon a substrate comprising:
   depositing a first magnetic layer having a crystalline structure and consisting of cobalt, iron, and boron, in an applied rotating magnetic field, upon the substrate using electrodeposition techniques;
   depositing gap material upon a portion of the first magnetic layer;
   depositing insulating material upon a portion of the first magnetic layer; and
   depositing a second magnetic layer, in an applied rotating magnetic field, upon the insulating rotating magnetic field, upon the insulating material and upon the gap material using electrodeposition techniques.

16. The method of claim 15 wherein the rotating magnetic field rotates between a normal angle and an angle about ninety degrees from the normal angle.

17. The method of claim 16 wherein the rotating magnetic field rotates between the normal angle and the angle about ninety degrees from the normal angle at a frequency of about one Hertz.

18. The method of claim 16 wherein the rotating magnetic field has a rotation cycle and the rotating magnetic field is at the normal angle for about 2/3 of the cycle and the angle is at about ninety degrees from the normal angle for about 1/3 of the cycle.

19. The method of claim 15 wherein the CoFeB alloy contains about 0.1% to about 2.0% boron by weight.

20. The method of claim 19 wherein the CoFeB alloy contains about 7.0% to about 12.0% iron by weight.

21. A method of forming a thin film magnetic read/write head having a thin film magnetic core and a substrate, an improvement comprising:
   depositing layers of a magnetic metal alloy having a crystalline structure consisting of about 0.1% to about 2.0% boron by weight, about 7.0% to about 12.0% iron by weight, and a balance of cobalt using electrodeposition techniques to form the thin film magnetic core on the substrate.

* * * * *

UNITED STATES PATENT AND TRADEMARK OFFICE
CERTIFICATE OF CORRECTION

PATENT NO. : 5,372,698
DATED : December 13, 1994
INVENTOR(S) : Simon H. Liao

It is certified that error appears in the above-indentified patent and that said Letters Patent is hereby corrected as shown below:

Col. 2, line 51, delete "field M", insert --field H--

Col. 2, line 55, delete "M,", insert --H,--

Col. 2, line 64, delete "applied M", insert --applied H--

Col. 2, line 66, delete "$4\pi M$,", insert --$4\pi M_s$--

Col. 3, line 15, delete "field M", insert --field H--

Col. 3, line 43, delete "field M", insert --field H--

Col. 3, line 46, delete "field M", insert --field H--

Col. 3, line 55, delete "field M", insert --field H--

Col. 3, line 58, delete "applied M", insert --applied H--

Col. 3, line 62, delete "-$4\pi M$,", insert --$4\pi M_s$--

UNITED STATES PATENT AND TRADEMARK OFFICE
CERTIFICATE OF CORRECTION

PATENT NO. : 5,372,698
DATED : December 13, 1994
INVENTOR(S) : SIMON H. LIAO

It is certified that error appears in the above-indentified patent and that said Letters Patent is hereby corrected as shown below:

Col. 4, line 32, delete "labelled M", insert --Labelled H--

Col. 4, line 38, delete "pole 20", insert --pole tip 20--

Col. 4, line 47, delete "lined", insert --line--

Col. 4, line 51, delete "file M", insert --field M--

Col. 8, line 8, delete "maybe", insert -- may be --

Signed and Sealed this

Ninth Day of May, 1995

Attest:

BRUCE LEHMAN

Attesting Officer

Commissioner of Patents and Trademarks